United States Patent [19]

Dressler et al.

[11] Patent Number: 5,244,725
[45] Date of Patent: Sep. 14, 1993

[54] HYDROXYALKYL ARYL ETHERS OF DI- AND POLYHYDRIC PHENOLS

[75] Inventors: Hans Dressler, Monroeville; Alex Peterson, Jr., Pittsburgh, both of Pa.

[73] Assignee: Indspec Chemical Corporation, Pittsburgh, Pa.

[21] Appl. No.: 840,487

[22] Filed: Feb. 24, 1992

[51] Int. Cl.$^5$ .................. C08L 61/00; B32B 25/07
[52] U.S. Cl. ................... 428/289; 428/290; 428/295; 428/492; 524/508; 525/65; 525/107; 525/109; 525/132
[58] Field of Search .............. 428/363, 288, 289, 295, 428/492, 290; 156/330, 910; 523/400, 439, 466; 524/508, 925; 525/65, 107, 109, 118, 132

[56] References Cited

U.S. PATENT DOCUMENTS

| | | | |
|---|---|---|---|
| 3,036,948 | 5/1962 | Danielson | 156/910 X |
| 3,578,613 | 5/1971 | Tai | 156/910 X |
| 4,054,634 | 10/1977 | Marshall et al. | 264/210 F |
| 4,092,455 | 5/1978 | Pinto et al. | 428/295 |
| 4,605,696 | 8/1986 | Benko et al. | 524/432 |
| 4,731,430 | 3/1988 | Kempter et al. | 528/139 |
| 4,889,891 | 12/1989 | Durairag et al. | 525/139 |
| 4,892,908 | 1/1990 | Durairag et al. | 525/160 |
| 5,021,522 | 6/1991 | Durairag et al. | 525/502 |
| 5,030,692 | 7/1991 | Durairaj | 525/134 |

FOREIGN PATENT DOCUMENTS 47-32743 8/1972 Japan .

Primary Examiner—George F. Lesmes
Assistant Examiner—Christopher Brown
Attorney, Agent, or Firm—Arnold B. Silverman; Craig G. Cochenour; Jolene W. Appleman

[57] ABSTRACT

A vulcanizable rubber composition is disclosed that includes (a) a rubber component selected from natural rubber, synthetic rubber or combinations thereof; (b) a methylene donor; and (c) a methylene acceptor which is the addition product of (1) at least one of the compounds including a dihydric phenol, a polyhydric phenol, a dihydric phenolic resin or a polyhydric phenolic resin, and (2) at least one of the compounds including a mono oxirane compound, an alkylene carbonate having from about 2 to 18 carbon atoms, or a poly oxirane compound. The addition product of this invention is a hydroxyalkyl aryl ether having from about 25 to 85 percent of the hydroxyl groups of the di- or polyhydric phenol or the di or polyhydric phenolic resin unreacted. A reinforced rubber article is also provided.

34 Claims, No Drawings

HYDROXYALKYL ARYL ETHERS OF DI- AND POLYHYDRIC PHENOLS

BACKGROUND OF THE INVENTION

1. Field of the Invention

This invention relates to hydroxyalkyl aryl ethers of di- and polyhydric phenols and phenolic resins as bonding and stiffening agents having improved physical and mechanical properties such as low volatility, reduced fuming in rubber compounding and improved adhesion properties of vulcanizable rubber and rubber composites.

2. Brief Description of the Prior Art

The performance of rubber composites in articles such as tires, belts and hose products depends on the quality of adhesion between the rubber and reinforcing materials as well as on the mechanical properties of the cured rubber matrix in contact with the reinforcing materials.

The conventional method of optimizing the adhesion of the rubber to the reinforcement entails compounding into the rubber before vulcanization a two part adhesive system that includes a methylene donor and a methylene acceptor. The methylene donor generates methylene or methylol groups capable of reacting or cross linking with a methylene acceptor which interacts with the rubber and reinforcing material with a resultant increase in adhesion of the rubber to the reinforcing material. Because the methylene donor and the methylene acceptor are compounded into the rubber, they have a significant effect on the properties of the final reinforced rubber product.

Dihydric phenols, such as for example resorcinol, polyhydric phenols, such as for example thio-bisphenols including thio-bis-resorcinol or thio-bis-4,4'-diphenol, and phenolic resins, such as for example resorcinol formaldehyde novolak resins, phenol formaldehyde novolak resins and phenol resorcinol formaldehyde novolak resins have long been used in the rubber industry as methylene acceptors. Although these methylene acceptors increase the adhesion of the rubber to the reinforcing materials, they have drawbacks, for example, resorcinolic methylene acceptors can present processing problems by producing volatiles such as resorcinol at Banbury temperatures.

The most commonly used methylene donors are, such as for example, hexamethylenetetramine and various methylol or methoxymethyl melamines. Many other methylene donors are set forth in U.S. Pat. No. 3,751,331.

The in situ resin formed by the reaction of the methylene acceptor and the methylene donor promotes adhesion between the rubber and reinforcing materials such as, for example steel, glass and organic or inorganic filaments, fibers, cords and fabrics, and provides improved rubber vulcanizate properties such as hardness and dynamic stiffness. These compounding additives also act as thermosetting or vulcanizing plasticizers providing easier processability and as excellent extrusions for the rubber compounds. The disadvantage, however, of many of these compounding additives such as, for example, resorcinol is that they generate an undesirable amount of fuming in Banbury mixing and calendering operations.

U.S. Pat. No. 4,889,891 discloses alkyl substituted resorcinolic novolak resins as suitable methylene acceptors for vulcanizable rubber compositions.

U.S. Pat. No. 4,892,908 discloses the use of keto derivatives of resorcinol such as, for example, benzoyl resorcinol.

U.S. Pat. No. 4,605,696 discloses monoesters of resorcinol including resorcinol monobenzoate and resorcinol monorosinate.

U.S. Pat. No. 5,021,522 discloses aralkyl substituted resorcinolic novolak resins such as, for example, a styrene substituted resorcinol formaldehyde resin.

U.S. Pat. No. 5,030,692 discloses alkylphenol modified resorcinolic novolak resins.

In spite of these prior art disclosures, there remains a very real and substantial need for the further improved bonding additive hydroxyalkyl aryl ethers of di-and polyhydric phenols and phenolic resins of this invention that may be used as methylene acceptors, which in combination with suitable methylene donors, have enhanced curing properties, and mechanical properties, and that function as improved bonding and stiffening agents in vulcanizable rubber compositions.

SUMMARY OF THE INVENTION

The present invention has met the above-described need. The present invention provides a vulcanizable rubber composition having (a) a rubber component selected from natural rubber, synthetic rubber or combinations thereof, (b) a methylene donor, and (c) a methylene acceptor which is the addition product of (1) at least one of the compounds which comprises a dihydric phenol, a polyhydric phenol, a dihydric phenolic resin or a polyhydric phenolic resin, and (2) at least one of the compounds which comprises a mono oxirane compound, an alkylene carbonate having from about 2 to 18 carbon atoms, or a poly oxirane compound, wherein the addition product is a hydroxyalkyl aryl ether having about 25 to 85% of the hydroxyl groups of the di- or polyhydric phenol or the di- or polyhydric phenolic resin unreacted.

In another embodiment of this invention, the vulcanizable rubber composition as hereinbefore described includes a catalyst for carrying out the reaction of the addition product. The catalyst includes, for example, trialkylphosphine, triaryl phosphine, trialkylamine, dialkylaminomethylated phenol, 4-dimethylaminopyridine or other organic or inorganic bases, or a quaternary ammonium compound.

A preferred embodiment of this invention is the vulcanizable rubber composition as hereinbefore described that includes the methylene acceptor incorporated into the rubber component in an amount from about 1 to 25 parts by weight based on 100 parts by weight of the rubber component.

In a most preferred embodiment of this invention, a vulcanizable rubber composition as hereinbefore described is provided wherein the polyhydric phenol is resorcinol and the polyoxirane compound is the diglycidyl ether of bisphenol A. This embodiment includes the methylene acceptor incorporated into the rubber component in an amount from about 1 to 5 parts by weight based on 100 parts by weight of the rubber component.

In another embodiment of this invention, a vulcanizable rubber composition as hereinbefore described is provided wherein amorphous silica is added to the addition product.

In another embodiment of this invention, a vulcanizable rubber composition is provided as hereinbefore described wherein the weight ratio of methylene acceptor to the methylene donor is from about 1:10 to 10:1.

In a further embodiment of this invention, a vulcanizable rubber composition is provided as hereinbefore described that includes a reinforcing material. This reinforcing material includes, for example, nylon, rayon, polyester, aramid, glass or steel in the form of filaments, fibers, cords or fabrics.

In another embodiment of this invention, a vulcanizable rubber composition is provided as hereinbefore described wherein the mole ratio of the di- or polyhydric phenol or the di- or polyhydric phenolic resin to the mono oxirane compound, alkylene carbonate or poly oxirane compound is from about 1:0.05 to 1:1.6.

Additionally, this invention provides a reinforced rubber article including (a) a rubber component selected from natural rubber, synthetic rubber or combinations thereof; (b) a methylene donor; (c) a methylene acceptor which is the addition product of (1) at least one of the compounds which comprises a dihydric phenol, a polyhydric phenol, a dihydric phenolic resin or a polyhydric phenolic resin, and (2) at least one of the compounds which comprises a mono oxirane compound, an alkylene carbonate having from about 2 to 18 carbon atoms, or a poly oxirane compound, wherein the addition product is a hydroxylalkyl aryl ether having about 25 to 85% of the hydroxyl groups of the di- or polyhydric phenol or the di- or polyhydric phenolic resin unreacted; and (d) a reinforcing material.

In a preferred embodiment of this invention, a reinforced rubber article as hereinbefore described is provided wherein the polyhydric phenol is resorcinol and the polyoxirane compound is the diglycidyl ether of bisphenol A.

It is an object of this invention to provide a vulcanizable rubber composition having improved physical and mechanical properties.

It is a further object of this invention to provide a vulcanizable rubber composition having improved adhesion between the rubber and reinforcing material, while at the same time having improved mechanical properties for the cured rubber matrix in contact with the reinforcing material.

It is an object of the present invention to provide a vulcanizable rubber composition having a methylene acceptor which is the addition product of at least one of the compounds including a dihydric phenol, a polyhydric phenol, a dihydric phenolic resin or a polyhydric phenolic resin, and at least one of the compounds including a mono oxirane compound, an alkylene carbonate having from about 2 to 18 carbon atoms or a poly oxirane compound.

It is a further object of the present invention to provide a vulcanizable rubber composition wherein the methylene acceptor is an addition product that results in a hydroxylalkyl aryl ether having about 25 to 85% of the hydroxyl groups of the di- or polyhydric phenol or the di- or polyhydric phenolic resin unreacted.

It is a further object of the present invention to provide a reinforced rubber article that includes a methylene acceptor that is a hydroxylalkyl aryl ether having about 25 to 85% of the hydroxyl groups of the di- or polyhydric phenol or the di- or polyhydric phenolic resin unreacted.

These and other objects of the invention will be more fully understood from the following description of the invention and the claims appended hereto.

DESCRIPTION OF THE PREFERRED EMBODIMENTS

The present invention is directed to a vulcanizable rubber composition having improvements in the physical and mechanical properties such as, for example, dynamic stiffness, hardness, scorch safety and cure time.

As used herein, the term "oxirane" means the epoxide or alkylene oxide group having a general structural formula (I)

wherein X represents the point of attachment to the remainder of the molecule. It is well known by those skilled in the art that the epoxide function generally appears in the general structural form (II)

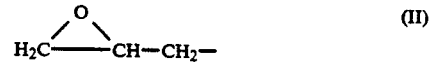

which is known as the glycidyl group and is attached to the remainder of a compound by such as, for example, an oxygen (i.e. glycidyl ether), nitrogen (i.e. glycidyl amine or amide), or carboxyl group (i.e. glycidyl ester).

The vulcanizable rubber composition of this invention includes (a) a rubber component selected from natural rubber, synthetic rubber or combinations thereof; (b) a methylene donor; and (c) a methylene acceptor which is the addition product of (1) at least one of the compounds which comprises a dihydric phenol, a polyhydric phenol, a dihydric phenolic resin or a polyhydric phenolic resin and (2) at least one of the compounds which comprises a mono oxirane compound, an alkylene carbonate having from about 2 to 18 carbon atoms, or a poly oxirane compound, wherein the addition product is a hydroxylalkyl aryl ether having from about 25 to 85% of the hydroxyl groups of the di- or polyhydric phenol or the di- or polyhydric phenolic resin unreacted. The vulcanizable rubber composition of this invention includes carrying out the reaction of the addition product in the presence of a catalyst. It will be appreciated by those skilled in the art that the catalyst includes, for example, trialkyl phosphine, triaryl phosphine, trialkylamine, dialkylamino methylated phenol, 4-dimethylaminopyridine or other organic or inorganic bases, or a quaternary ammonium compound. It is well known in the art that the quaternary ammonium compound includes, such as for example, tetraalkylammonium halides or sulfates such as tetrabutylammonium halide or sulfate, and benzyltrimethylammonium halide or hydroxide.

The di- or polyhydric phenol of the hereinbefore described invention includes, for example, resorcinol, catechol, dihydroxybiphenyl, trihydroxybiphenyl, hydroquinone, alkylidene bisphenols or thio-bisphenols. The alkylidene group of the alkylidene bisphenols has from about 1 to 12 carbon atoms. The alkylidene bisphenols include, such as, for example, 4,4'-methylenediphenol (bisphenol F) and 4,4'-isopropylidenediphenol (bisphenol A). The di- or polyhydric phenolic resins of this invention include di- or polyhydric phenol including, for example, resorcinol, catechol, dihydroxybiphenyl, trihydroxybiphenyl, hydroquinone or aldehyde resins thereof.

A further embodiment of this invention includes the di- or polyhydric phenol as hereinbefore described which is substituted by at least one of the groups including an alkyl group having from about 1 to 12 carbon atoms, and aralkyl group having from about 1 to 12 carbon atoms, and an alkanoyl group having from about 2 to 18 carbon atoms an aroyl group having from about 7 to 11 or a halogen selected from the group consisting of chlorine and bromine.

The mono oxirane compound of this invention includes, for example, saturated or unsaturated alkylene oxides having from about 2 to 18 carbon atoms, a glycidyl ether compound, a glycidyl ester compound, or mixtures thereof. The unsaturated alkylene oxide includes at least one carbon to carbon double bond.

The alkylene oxide compound of this invention includes, for example, ethylene oxide, alpha-olefin oxides having from about 4 to 18 carbon atoms, propylene oxide, styrene oxide, cyclohexene oxide, 4-vinylcyclohexene monoxide, glycidol or mixtures thereof.

The poly oxirane compound of the hereinbefore described invention includes, for example, 4-vinylcyclohexene dioxide, epoxidized glycerides of unsaturated fatty acids, epoxidized nitrogen-containing material, epoxy tallate, polyglycidyl ethers, polyglycidyl esters, or mixtures thereof. The polyglycidyl ethers include, for example, diglycidyl ether of bisphenol A, diglycidyl ether of bisphenol F, trimethylol propane triglycidyl ether, a poly glycidol ether of caster oil, a bis(3,4-epoxycyclohexyl) adipate, a dibromo-neopentyl diglycidyl ether, or a glycidyl ether of a novolak epoxy resin. The glycidyl ether of the novolak epoxy resin of this invention includes, for example, polyglycidyl ethers of the di- or polyhydric phenolic resins as hereinbefore described. The epoxidized nitrogen-containing material of the poly oxirane compound includes, for example, triglycidyl isocyanurate or triglycidyl para-aminophenol.

Another embodiment of this invention includes a vulcanizable rubber composition as hereinbefore described wherein the methylene acceptor is incorporated into the rubber component in an amount from about 1 to 25 parts by weight based on a 100 parts by weight of the rubber component.

In a preferred embodiment of this invention a vulcanizable rubber composition is provided as hereinbefore described wherein the polyhydric phenol is resorcinol and the poly oxirane compound is the diglycidyl ether of bisphenol A. Additionally, this vulcanizable rubber composition includes amorphous silica that has been added to the addition product. This preferred embodiment also includes triphenylphosphine as the catalyst.

In a most preferred embodiment of this invention, a vulcanizable rubber composition is provided as hereinbefore described wherein the polyhydric phenol is resorcinol and the poly oxirane compound is the diglycidyl ether of bisphenol A. The methylene acceptor that results from this addition product is incorporated into the rubber component in an amount from about 1 to 5 parts by weight based on 100 parts by weight of the rubber component.

In another embodiment of this invention, a vulcanizable rubber composition is provided as hereinbefore described wherein the weight ratio of the methylene acceptor to the methylene donor is from about 1:10 to 10:1.

It will be understood by those skilled in the art that the methylene donor employed in this invention includes, such as for example, hexamethylenetetramine (hereinafter HMTA), di-, tri-, tetra-, penta-, or hexa-N-methylol-melamine or their partially or completely etherified or esterified derivatives, such as for example, hexamethyoxymethyl-melamine (hereinafter HMMM), oxazolidine or N-methyl-1,3,5-dioxazine.

In a further embodiment of this invention, a vulcanizable rubber composition is provided as hereinbefore described which further includes a reinforcing material. This reinforcing material includes, such as for example, nylon, rayon, polyester, aramid, glass, steel (brass or zinc plated) or other inorganic compositions. These reinforcing materials may be in the form of filaments, fibers, cords or fabrics.

It will be understood by those skilled in the art that the vulcanizable rubber composition of this invention may also include at least one additive comprising sulfur, carbon black, zinc oxide, silica, an anti-oxidant well known by those skilled in the art, a sterate, an accelerator well known by those skilled in the art, an oil or an adhesion promoter well known by those skilled in the art.

A further embodiment of this invention provides a vulcanizable rubber composition as hereinbefore described wherein the mole ratio of the di- or polyhydric phenol or the di- or polyhydric phenolic resin to the mono oxirane compound, alkylene carbonate or poly oxirane compound is from about 1:0.05 to 1:1.6.

The resin formed by the reaction of the methylene acceptor of this invention and the methylene donor promotes adhesion between the rubber and the reinforcing materials as hereinbefore described while simultaneously providing an improvement in the rubber vulcanizate properties such as hardness and dynamic stiffness, as well as improving scorch safety time and providing longer cure times when compared to the prior art.

It will be understood that the present invention is directed to a vulcanizable rubber composition having improved adhesion properties for adhering rubber to a reinforcing material as hereinbefore described. The reinforcing material may optionally be pre-reacted or coated with adhesives. It will be appreciated, however, that the present invention has applicability whether or not the reinforcing material is pre-coated or pre-reacted with adhesive materials.

As will be appreciated by those skilled in the art, the rubber component, additives, reinforcing materials and methylene donor compounds are the same as have been used in the prior art. In addition, the method of vulcanizing the compositions is the same as the prior art. The improvements of the present invention are related to the methylene acceptor as hereinbefore described.

It will be understood by those skilled in the art that it may be beneficial to carry out the reaction of the addition product in the presence or absence of one or more solvents. Examples of suitable solvents include aromatic hydrocarbons, such as for example, toluene, xylene, ethyl benzene, or ketones such as methylisobutyl ketone.

The present invention is further illustrated by the following examples:

EXAMPLE 1

This example illustrates the preparation of a methylene acceptor of this invention which is the addition product of resorcinol and the diglycidyl ether of bisphenol A. This addition product was prepared in a 1-liter reactor equipped with an agitator, thermometer and reflux condenser. The reactor was charged with about 55.1 g. (gram) resorcinol, 250 ml (milliliter) toluene and 0.5 g. triphenylphosphine. The charge was stirred, heated to reflux at about 113° C. (centigrade) and about 90.4 g. of diglycidyl ether of bisphenol A (Dow epoxy resin DER-331) was added dropwise in about one hour. The solution was refluxed for about one hour and devolatilized to about 114° C. at reduced pressure to give a light tan resorcinol ether compound of this invention (RE1) having a 68° C. softening point, and having a 1.6 wt. % (percent) residual oxirane oxygen.

Table 1 shows the volatility of resorcinol (R), a prior art methylene acceptor, and the addition product of Example 1 of this invention (RE1) as determined by thermogravimetric analysis.

TABLE I

| Thermogravimetric Analysis of Resorcinol Compounds | | | |
|---|---|---|---|
| | % Weight Loss[1] | | |
| | 125° C. | 150° C. | 175° C. |
| Resorcinol (R) | 0.9 | 11.5 | 48.5 |
| Resorcinol Ether (RE1) | 0.5 | 1.7 | 3.0 |

[1]Heating rate = 20° C./minute in a nitrogen atmosphere

The weight loss at 125° C., 150° C. and 175° C. as shown in Table I for the resorcinol ether compound of this invention (RE1) is considerably lower than resorcinol and confirms the low volatility of the resorcinol ether compound (RE1) disclosed in this invention. It will be appreciated by those skilled in the art that lower volatility means less fuming during rubber processing.

EXAMPLE 2

A resorcinol-formaldehyde resin/diglycidyl ether of bisphenol A addition product was prepared in a lab reactor by a procedure comparable to that employed in Example 1. The reactor was charged with about 31.1 g. of a commercial resorcinol-formaldehyde resin, Penacolite B-19-S, (INDSPEC Chemical Corporation, Pittsburgh, Pa., U.S.A.), 125 ml methyl isobutyl ketone and 0.5 g. triphenylphosphine. Then, 90.4 g diglycidyl ether of bisphenol A (Dow epoxy resin DER-331) was added dropwise in about 0.5 hours. The stirred solution was refluxed for about one hour at about 117° C. and devolatilized at reduced pressure to give a dark amber resorcinol ether compound (RE2) having a 72° C. softening point, and having a 0.9 wt. % residual oxirane oxygen.

EXAMPLE 3

Black natural rubber compositions having the formulation shown in Table II were prepared in a three-stage mixing procedure to evaluate the adhesion and reinforcing effects of the resorcinol compounds of this invention as methylene acceptors in combination with the methylene donors hexamethoxymethylmelamine (HMMM) or hexamethylenetetramine (HMTA). Methylene acceptors of this invention, RE1 and RE2, and one of the methylene donors were tested at their estimated optimal weight ratios at constant combined loadings of 4 and 6 parts by weight of rubber in the rubber compound.

TABLE II

| Rubber Compound for Adhesion and Mechanical Properties | |
|---|---|
| MASTERBATCH | phr[1] |
| Natural Rubber | 100.0 |
| Carbon Black N-326 | 55.0 |
| Zinc Oxide | 8.0 |
| Stearic Acid | 1.2 |
| N-(1,3-Dimethyl butyl)-N'-Phenyl-p-Phenylene diamine | 2.0 |
| Polymerized 1,2-Dihydro-2,2,4-Trimethylquinoline | 1.0 |
| N-(Cyclohexylthio)Phthalimide | 0.2 |
| | 167.4 |
| Insoluble Sulfur | 3.75 |
| N-t-butyl-2-benzothiazolesulfenamide | 0.60 |
| Cobalt Naphthenate (12%) | 0.83 |
| Methylene Acceptor/Donor | Variable |

[1]parts by weight of rubber

The rubber masterbatch was mixed in the first stage to 150° C. in a Banbury mixer. In the second stage, the methylene acceptor of this invention, RE1 or RE2, with or without the inclusion of the cobalt compound was then mixed into an appropriate amount of the masterbatch on the two-roll mill at about 121° C. The sulfur, accelerator and appropriate amount of the methylene donor (HMMM or HMTA) were mixed in the third stage at about 95° C. The test compounds were conditioned overnight in a constant temperature room at about 23° C. and at about 50% relative humidity before being tested for rheometer cure, and shaped and optimum cured at 150° C. for the evaluation of wire adhesion and mechanical properties.

Cure properties were measured with a Monsanto 100 Rheometer at 150° C., 1 degree arc, and 1.67 Hz according to ASTM D 2084.

Wire pullout adhesion was determined for each test compound by ASTM D 2229 using 3×0.2+6×0.35 brass-plated steel cord with about 63.5% copper plating embedded 19.0 mm (millimeter) in the rubber pad.

Dynamic mechanical properties were determined with a Rheometrics Mechanical Spectrometer at 0.2 and 2.0% torsional shear strain at 1 Hz and about room temperature. Dynamic stiffness G' was measured at 0.2% strain and tangent delta, an indicator of compound hysteresis or heat build-up, was measured at 2.0% strain.

The prior art methylene acceptor resorcinol (R), and the methylene acceptor resorcinol ether compounds of Example 1 (RE1) and Example 2 (RE2) of this invention were each combined with the methylene donor HMMM and evaluated for cure, wire adhesion and mechanical properties according to the rubber compound formulation shown in Table II and the mixing and testing procedures set forth in Example 3. The prior art resorcinol (R) methylene acceptor served as a control for the purpose of evaluating the physical and mechancial properties of RE1 and RE2 in the rubber compound. The test data are given in Table III for these methylene acceptor/methylene donor compounds at 6 parts by weight of rubber in the rubber compounds.

TABLE III

| Rubber Compound Properties | | | |
|---|---|---|---|
| Methylene Acceptor/Donor | R/HMMM | RE1/HMMM | RE2/HMMM |
| phr | 3.0/3.0 | 3.5/2.5 | 3.5/2.5 |
| Rheometer Cure at | | | |

TABLE III-continued

Rubber Compound Properties

| 150° C. | | | |
|---|---|---|---|
| MH-ML, dN-m | 56.0 | 55.1 | 46.7 |
| ts2, minutes | 2.8 | 5.0 | 4.0 |
| t'90, minutes | 16.3 | 24.1 | 19.5 |
| Wire Adhesion, lbs. (% Rubber Coverage) | | | |
| Unaged | 242(84) | 277(90) | 289(91) |
| Steam, 24 hours at 120° C. | 284(95) | 251(80) | 255(90) |
| Humidity, 21 days at 85° C./95% RH | 221(90) | 215(80) | 224(90) |
| Dynamic Mechanical | | | |
| G' at 0.2% strain, MPA | 39.57 | 43.28 | 35.75 |
| Tangent Delta at 2.0% strain | 0.199 | 0.174 | 0.195 |
| Shore A Hardness | 85 | 88 | 87 |

Table III shows that the dynamic stiffness G' and hardness are higher for RE1/HMMM composition of this invention in comparison to the prior art R/HMMM compound. Table III shows that the wire adhesion data at 21 days is similar for the RE1/HMMM and RE2/HMMM compositions and the R/HMMM compound.

The data show that the resorcinol-ether compositions RE1/HMMM and RE2/HMMM of this invention have improved scorch safety as indicated by the longer scorch times (ts2) of 5.0 and 4.0 minutes for RE1/HMMM composition and RE2/HMMM composition, respectively, when compared to 2.8 minutes for the prior art R/HMMM compound.

EXAMPLE 4

A resorcinol/diglycidyl ether of bisphenol A addition product was prepared in a 3-liter reactor equipped with an agitator, thermometer and reflux condenser. The reactor was charged with about 330.3 g. resorcinol, 1500 ml. toluene and 3.0 g. triphenylphosphine. The stirred charge was heated to reflux at about 112° C. and about 654.0 g. diglycidyl ether of bisphenol A (Ciba-Geigy Araldite GY 6004) was added dropwise in about 2.5 hours. The charge was refluxed for about one hour, devolatilized at reduced pressure and about 36.0 g. amorphous silica was added to obtain a light tan resorcinol ether compound (RE4) having a 77° C. softening point, and having a 0.45 wt. % residual oxirane oxygen.

The prior art methylene acceptor resorcinol (R), and the methylene acceptor resorcinol ether compound of Example 4 (RE4) were each separately combined with the methylene donor HMTA without the inclusion of cobalt naphthenate in the rubber compound formulation of Table II. Test compounds were mixed and tested for cure and mechanical properties according to the procedures of Example 3. The test data are given in Table IV for these methylene acceptor/methylene donor compounds at 4 parts by weight of rubber in the rubber compound.

TABLE IV

Rubber Compound Properties

| Methylene Acceptor/Donor | R/HMTA | RE4/HMTA |
|---|---|---|
| phr | 2.6/1.4 | 3.4/0.6 |
| Rheometer Cure at 150° C. | | |
| MH-ML, dN-m | 53.8 | 51.1 |
| ts2, minutes | 2.4 | 3.4 |
| t'90, minutes | 14.3 | 15.3 |
| Dynamic Mechanical | | |

TABLE IV-continued

Rubber Compound Properties

| G' at 0.2% strain, MPA | 27.08 | 37.61 |
|---|---|---|
| Tangent Delta at 2.0% strain | 0.199 | 0.189 |
| Shore A Hardness | 84 | 86 |

The data of Table IV clearly indicates that the dynamic stiffness G' is significantly improved for the RE4/HMTA composition of this invention (37.61) as compared to the dynamic stiffness of the prior art R/HMTA compound (27.08). Shore A hardness is also higher for the RE4/HMTA composition of this invention in comparison to the Shore A hardness of the prior art compound R/HMTA.

From the above data, therefore, it will be appreciated by those skilled in the art that the methylene acceptors of this invention significantly improve the physical and mechanical properties of the cured rubber composition over the conventional prior art resorcinol-methylene acceptor rubber composition, while at the same time maintaining the adhesion properties of the conventional prior art resorcinol-methylene acceptor rubber composition.

Another embodiment of this invention provides for a reinforced rubber article having (a) a rubber component selected from natural rubber, synthetic rubber or combinations thereof, (b) a methylene donor, (c) a methylene acceptor which is the addition product of (1) at least one of the compounds which comprises a dihydric phenol, a polyhydric phenol, a dihydric phenolic resin or a polyhydric phenolic resin, and (2) at least one of the compounds which comprises a mono oxirane compound, a alkylene carbonate having from about 2 to 18 carbon atoms, or a poly oxirane compound, wherein the addition product is a hydroxylalkyl aryl ether having from about 25 to 85% of the hydroxyl groups of the di- or polyhydric phenol or the di- or polyhydric phenolic resin unreacted, and (d) a reinforcing material. This invention includes providing a reinforced rubber article as hereinbefore described wherein the reaction of the addition product is carried out in the presence of a catalyst. Examples of the reinforcing material and the catalyst have been hereinbefore described.

It will be appreciated by those skilled in the art that the vulcanizable rubber composition provided by this invention includes a methylene acceptor which is the addition product of at least one of the compounds which comprises a dihydric phenol, a polyhydric phenol, a dihydric phenolic resin or a polyhydric phenolic resin, and (2) at least one of the compounds which comprises a mono oxirane compound, an alkylene carbonate having from about 2 to 18 carbon atoms, or a poly oxirane compound. It will be appreciated that this addition product of this invention is a hydroxyalkyl aryl ether having from about 25 to 85% of the hydroxyl groups of the di- or polyhydric phenol or the dior polyhydric phenolic resin unreacted.

It will be understood by those skilled in the art that the methylene acceptor of this invention provides for an improvement in rubber compound processability, rubber to reinforcing material adhesion and rubber vulcanizate properties over the prior art. The hydroxyalkyl aryl ether methylene acceptors of this invention have low volatility and may be used to replace volatile phenolic compounds and resins, particularly resorcinol, to reduce rubber compound fuming in Banbury mixing and calendering operations.

Whereas particular embodiments of this invention have been described above for purposes of illustration, it will be evident to those persons skilled in the art that numerous variations and details of the present invention may be made without departing from the invention as defined in the appended claims.

We claim:

1. A vulcanizable rubber composition comprising: (a) a rubber component selected from natural rubber, synthetic rubber or combinations thereof; (b) a methylene donor; and (c) a methylene acceptor which is the addition product of (1) at least one of the compounds which comprises a dihydric phenol, a polyhydric phenol, a dihydric phenolic resin or a polyhydric phenolic resin, and (2) at least one of the compounds which comprises a mono oxirane compound, an alkylene carbonate having from about 2 to 18 carbon atoms, or a poly oxirane compound, said addition product is a hydroxylalkyl aryl ether having from about 25 to 85 percent of the hydroxyl groups of said di- or polyhydric phenol or said di- or polyhydric phenolic resin unreacted.

2. The composition of claim 1 wherein said reaction of said addition product is carried out in the presence of a catalyst.

3. The composition of claim 2 wherein said catalyst includes trialkyl phosphine, triarylphosphine, trialkylamine, dialkylaminomethylated phenol, 4-dimethylaminopyridine or a quaternary ammonium compound.

4. The composition of claim 2 wherein said di- or polyhydric phenol includes resorcinol, catechol, dihydroxybiphenyl, trihydroxybiphenyl, hydroquinone, alkylidene bisphenols wherein said alkylidene group has from about 1 to 12 carbon atoms, or thio-bisphenols.

5. The composition of claim 2 wherein said di- or polyhydric phenolic resin include said di- or polyhydric phenol including resorcinol, catechol, dihydroxybiphenyl, trihydroxybiphenyl, hydroquinone or aldehyde resins thereof.

6. The composition of claim 2 wherein said di- or polyhydric phenol is substituted by at least one of the groups comprising an alkyl group having from about 1 to 12 carbon atoms, an aralkyl group having from about 1 to 12 carbon atoms, an alkanoyl group having from about 2 to 18 carbon atoms, an aroyl group having from about 7 to 11 carbon atoms, or a halogen selected from the group consisting of chlorine and bromine.

7. The composition of claim 2 wherein said mono oxirane compound includes saturated or unsaturated alkylene oxides having from about 2 to 18 carbon atoms, a glycidyl ether compound, a glycidyl ester compound, or mixtures thereof.

8. The composition of claim 7 wherein said unsaturated alkylene oxide includes at least one carbon to carbon double bond.

9. The composition of claim 7 wherein said alkylene compound includes ethylene oxide, propylene oxide, alpha-olefin oxides having from about 4 to 18 carbon atoms, styrene oxide, cyclohexene oxide, 4-vinylcyclohexene monoxide, glycidol, or mixtures thereof.

10. The composition of claim 2 wherein said poly oxirane compound includes 4-vinylcyclohexene dioxide, epoxidized glycerides of unsaturated fatty acids, epoxidized nitrogen containing material, epoxy tallate, polyglycidyl ethers, polyglycidyl esters or mixtures thereof.

11. The composition of claim 10 wherein said polyglycidyl ethers include diglycidyl ether of bisphenol A, diglycidyl ether of bisphenol F, trimethylol propane triglycidyl ether, a polyglycidyl ether of castor oil, a bis (3,4-epoxycyclohexyl) adipate, a dibromo-neopentyl diglycidyl ether, or a glycidyl ether of a novolak epoxy resin.

12. The composition of claim 11 wherein said glycidyl ether of said novolak epoxy resin includes polyglycidyl ethers of said di- or polyhydric phenolic resins of claim 5.

13. The composition of claim 10 wherein said nitrogen containing material includes triglycidyl isocyanurate or triglycidyl para-aminophenol.

14. The composition of claim 2 wherein said methylene acceptor is incorporated into said rubber component in an amount from about 1 to 25 parts by weight based on 100 parts by weight of said rubber component.

15. The composition of claim 2 wherein said polyhydric phenol is resorcinol and said poly oxirane compound is diglycidyl ether of bisphenol A.

16. The composition of claim 15 wherein amorphous silica is added to said addition product.

17. The composition of claim 16 wherein said catalyst is triphenylphosphine.

18. The composition of claim 15 wherein said methylene acceptor is incorporated into said rubber component in an amount from about 1 to 5 parts by weight based on 100 parts by weight of said rubber component.

19. The composition of claim 2 wherein the weight ratio of methylene acceptor to said methylene donor is from about 1:10 to 10:1.

20. The composition of claim 2 wherein said methylene donor includes hexamethylenetetramine, di-,tri-, tetra-,penta- or hexa-N-methylol-melamine, hexamethyoxymethylmelamine, oxazolidine or N-methyl-1,3,5-dioxazine.

21. The composition of claim 1 including a reinforcing material.

22. The composition of claim 21 wherein said reinforcing material includes nylon, rayon, polyester, aramid, glass or steel in the form of filaments, fibers, cords or fabrics.

23. The composition of claim 1 including at least one additive comprising sulfur, carbon black, zinc oxide, silica, an antioxidant, a sterate, an accelerator, an oil or an adhesion promoter.

24. The composition of claim 2 wherein the mole ratio of said di- or polyhydric phenol or said di- or polyhydric phenolic resin to said mono oxirane compound, alkylene carbonate or poly oxirane compound is from about 1:0.05 to 1:1.6.

25. A reinforced rubber article comprising: (a) a rubber component selected from natural rubber, synthetic rubber or combinations thereof; (b) a methylene donor; (c) a methylene acceptor which is the addition product of (1) at least one of the compounds which comprises a dihydric phenol, a polyhydric phenol, a dihydric phenolic resin or a polyhydric phenolic resin, and (2) at least one of the compounds which comprises a mono oxirane compound, an alkylene carbonate having from about 2 to 18 carbon atoms, or a poly oxirane compound, said addition product is a hydroxylalkyl aryl ether having from about 25 to 85 percent of the hydroxyl groups of said di- or polyhydric phenol or said di- or polyhydric phenolic resin unreacted; and (d) a reinforcing material.

26. The reinforced rubber article of claim 24 wherein said reaction product is carried out in the presence of a catalyst.

27. The reinforced rubber article of claim 24 wherein said reinforcing material includes nylon, rayon, polyester, aramid, glass or steel in the form of filaments, fibers, cords or fabrics.

28. The reinforced rubber article of claim 24 wherein said methylene donor is incorporated into said rubber component in an amount from about 1 to 25 parts by weight based on 100 parts by weight of said rubber component.

29. The reinforced rubber article of claim 25 wherein said polyhydric phenol is resorcinol and said poly oxirane compound is diglycidyl ether of bisphenol A.

30. The reinforced rubber article of claim 28 wherein amorphous silica is added to the said addition product.

31. The reinforced rubber article of claim 29 wherein said catalyst is triphenylphosphine.

32. The reinforced rubber article of claim 28 wherein said methylene acceptor is incorporated into said rubber component in an amount from about 1 to 5 parts by weight based on 100 parts by weight of said rubber component.

33. The reinforced rubber article of claim 24 wherein the weight ratio of said methylene acceptor to said methylene donor is from about 1:10 to 10:1.

34. The reinforced rubber article of claim 24 wherein the mole ratio of said di- or polyhydric phenol or said di- or polyhydric phenolic resin to said mono oxirane compound, alkylene carbonate or poly oxirane compound is from about 1:0.05 to 1:1.6.

* * * * *